United States Patent [19]

Beyer et al.

[11] Patent Number: 4,780,951
[45] Date of Patent: Nov. 1, 1988

[54] APPARATUS FOR CHANGING TOOLS IN GRINDING MACHINES AND THE LIKE

[75] Inventors: Rudolf Beyer, Esslingen; Lutz-Peter Heerdt, Altbach; Roland Schemel, Schorndorf, all of Fed. Rep. of Germany

[73] Assignee: Schaudt Maschinenbau GmbH, Stuttgart, Fed. Rep. of Germany

[21] Appl. No.: 879,267

[22] Filed: Jun. 27, 1986

[30] Foreign Application Priority Data

Jun. 29, 1985 [DE] Fed. Rep. of Germany ....... 3523376

[51] Int. Cl.[4] .............................................. B23Q 3/157
[52] U.S. Cl. ........................................ 24/568; 51/168
[58] Field of Search .................... 29/264, 568; 51/168, 51/161

[56] References Cited

U.S. PATENT DOCUMENTS

| | | | |
|---|---|---|---|
| 3,627,490 | 12/1971 | Asano | 51/168 |
| 3,925,878 | 12/1975 | Kikuchi | 29/568 |
| 3,967,415 | 7/1976 | Seckinger et al. | 51/168 |
| 4,344,221 | 8/1982 | Pagani | 29/568 |
| 4,363,166 | 12/1982 | Hiller | 29/568 |
| 4,399,604 | 8/1983 | Krug | 29/568 |
| 4,528,743 | 7/1985 | Bleich | 51/168 |
| 4,551,953 | 11/1985 | Lewendowski | 51/168 |
| 4,654,953 | 4/1987 | Hobbs | 29/568 |

FOREIGN PATENT DOCUMENTS

| | | |
|---|---|---|
| 58913 | 7/1982 | European Pat. Off. |
| 2024212 | 12/1970 | Fed. Rep. of Germany |
| 3246168 | 7/1983 | Fed. Rep. of Germany |

Primary Examiner—Z. R. Bilinsky
Attorney, Agent, or Firm—Peter K. Kontler

[57] ABSTRACT

A surface grinding machine wherein the spindle for grinding wheels is mounted on a slide which is reciprocable to and from a tool changing station. A transfer unit at the changing station has a head which is indexible on a base and has two aligned or crossing arms with discrete tool clamping mechanisms. Each clamping mechanism can accept a tool from the spindle in such orientation that the axis of the tool is horizontal, and the head is then indexed to change the orientation of the axis of the tool from horizontal to vertical before the tool is deposited in a selected carrier of a depository for tools. The depository is movable relative to the tool changing station to place a selected carrier into proper position for reception of a tool or for removal of a tool therefrom and/or to move the depository to and from a magazine for tools.

26 Claims, 9 Drawing Sheets

APPARATUS FOR CHANGING TOOLS IN GRINDING MACHINES AND THE LIKE

BACKGROUND OF THE INVENTION

The present invention relates to machine tools in general, and more particularly to improvements in tool changing apparatus for use in machine tools, especially in circular grinding machines which operate with large grinding wheels.

Shortening of down times is sought in all types of modern high-speed machine tools which are designed to treat workpieces at a high frequency. Down times are unavoidable during an exchange of workpieces, frequently during dressing of grinding wheels in a grinding machine, and particularly during an exchange of tools. A reduction of down times during the exchange of tools in a high-speed grinding machine can be avoided by using a tool magazine and a tool changer which is operated in response to signals from the automatic control system of the machine so that the exchange of tools is integrated into automatic operation of the machine. A grinding wheel must be exchanged when the wear upon its working surface is so pronounced that it is necessary to insert a new grinding wheel, or when a particular workpiece or two or more successive workpieces must be treated by different grinding wheels. In the latter instance, the previously used grinding wheel is detached from the spindle and is placed into storage while one or more other grinding wheels are in actual use.

German Offenlegungsschrift No. 20 24 212 discloses a grinding wheel changing apparatus which is designed to transfer grinding wheels between a horizontal tool spindle and a magazine wherein the grinding wheels are temporarily stored in such orientation that the axis of rotation of each grinding wheel is substantially horizontal. Thus, the orientation of the grinding wheel remains unchanged during transfer from the spindle into the magazine or vice versa.

German Offenlegungsschrift No. 32 46 168 discloses a changing apparatus which manipulates the grinding wheels in the same way as the apparatus of the Auslegeschrift, i.e., the axis of each tool remains horizontal during transfer from the spindle as well as during storage in the magazine.

A drawback of the aforedescribed conventional tool changing apparatus is that the grinding wheels are stored in such positions that their axes are horizontal, i.e., that the grinding wheels are disposed in substantially vertical planes. The pores of grinding wheels which are removed from the spindle for temporary storage in a magazine are filled with coolant (normally water). The coolant tends to accumulate in the lower portion of a stationary grinding wheel, i.e., at a level below the horizontal axis of such grinding wheel, so that the grinding wheel is out of balance. When the grinding wheel is returned to and is affixed to the spindle, it must be gradually accelerated during a relatively long interval of time in order to allow for renewed uniform distribution of the cooling medium therein. This reduces the output of the grinding machine because the sum of intervals which are required for gradual acceleration of previously used grinding wheels during an entire shift contributes significantly to the total down time.

European patent application No. 00 58 913 discloses a magazine for a stack of superimposed grinding wheels which are held in such orientation that their axes are substantially vertical. Each grinding wheel is held by a discrete arm, and the arms are pivotable about a vertical axis in order to introduce the respective grinding wheels into or to withdraw the respective grinding wheels from the magazine. The arm which has withdrawn the respective grinding wheel from the magazine is thereupon caused to change the orientation of the grinding wheel through 90° so that the axis of the grinding wheel is horizontal. The purpose of such change in orientation is to facilitate the task of the operator who is to transfer the grinding wheel into the machine. The European patent application does not disclose a tool changing apparatus and/or the manner of integrating such apparatus into an automatically operated grinding machine.

OBJECTS AND SUMMARY OF THE INVENTION

An object of the invention is to provide a novel and improved tool changing apparatus which can be readily integrated into an automatically operated machine tool in such a way that the total down time for an exchange of tools is reduced to a fraction of heretofore necessary down times.

Another object of the invention is to provide a tool changing apparatus which can be used with particular advantage in or in conjunction with circular grinding machines employing large grinding wheels.

A further object of the invention is to provide a tool changing apparatus which can manipulate grinding wheels in such a way that a grinding wheel which is to be returned from storage to the grinding station can be immediately accelerated to full operating speed without risking damage to the wheel and/or inaccurate treatment of the workpieces.

An additional object of the invention is to provide a tool changing apparatus which is constructed and assembled in such a way that coolant which accumulates in or on the tools is properly distributed during storage to allow for immediate operation at full speed as soon as a tool which was temporarily stored is put to renewed use.

Still another object of the invention is to provide a novel and improved method of manipulating grinding wheels during intervals of temporary storage subsequent to removal from the grinding spindle.

A further object of the invention is to provide a machine tool which embodies or is combined with the above outlined tool changing apparatus.

Another object of the invention is to provide a novel and improved circular grinding machine which embodies the aforedescribed tool changing apparatus.

An additional object of the invention is to provide the apparatus with a novel and improved tool transferring unit and with a novel and improved depository for removed tools.

A further object of the invention is to provide novel and improved means for confining the tool which is mounted on the torque transmitting support of a grinding machine or the like.

The invention is embodied in a machine tool which operates with rotary tools, particularly in a circular grinding machine which operates with large grinding wheels. The machine tool comprises a tool support (for example, a spindle carrier mounted on a reciprocable slide) which serves to carry at least one rotary tool so that the axis of rotation of the tool is at least substantially horizontal, means (such as the aforementioned slide) for moving the support along a predetermined path toward and away from a tool changing station, a depository for tools disposed at the tool changing station and having carrier means for supporting tools in such orientation that the axes of the tools are at least substantially vertical, and transfer means for transferring tools between the support and the carrier means at the tool changing station. The transfer means comprises means for changing the orientation of the axes of tools from substantially horizontal to substantially vertical during transfer from the support to the carrier means and from substantially vertical to substantially horizontal during transfer from the carrier means to the support. The machine tool preferably further comprises means for moving the carrier means with reference to the tool changing station.

In accordance with a presently preferred embodiment of the invention, the transfer means comprises a base, a head which is mounted on the base for angular movement about a predetermined axis, at least one arm on the head, tool clamping means on the arm, and actuating means for engaging the clamping means with and for disengaging the clamping means from a tool on the support or on the carrier means. Such machine preferably further comprises means for transporting tools at the tool changing station between the transfer means on the one hand and the support or the carrier means on the other hand. The transfer means preferably comprises several arms, for example, two arms which are disposed substantially at right angles to each other, and discrete clamping means on each of the two or more arms. Each clamping means preferably defines a discrete axis coinciding with the axis of the tool which is held by the respective clamping means, and the predetermined axis is preferably disposed at an angle of substantially 45° to the vertical as well as to each of the discrete axes. The transfer means preferably further comprises transporting means for reciprocating each clamping means in the direction of the respective discrete axis.

Each arm preferably comprises elongated guide means for the respective clamping means, and the transporting means preferably comprises motor means (e.g., a cylinder and piston unit) for moving the clamping means along the respective guide means. Each clamping means can comprise a rail, and each motor means can include means for moving the rail along the respective guide means.

The support preferably comprises a rotary spindle for tools and an enclosure for the spindle and for the tool which is held by the spindle. The enclosure includes a housing which is provided on the support and has a window for the passage of a tool during transfer of the tool between the spindle and the arm, and at least one separable cover or lid for the window. The arm has means for releasably holding the lid. The enclosure preferably further comprises means for releasably coupling a lid to the housing, and the holding means preferably includes means for locating the lid in a predetermined position. The coupling means can comprise a first coupling device on each lid, a second coupling device on the housing, and means for moving one of the coupling devices into and from engagement with the other coupling device. The second coupling device can comprise a ring (this term is intended to embrace a complete ring or a segment of a ring) movable about the axis of the tool which is held by the clamping means between a first position of engagement with and a second position of disengagement from the first coupling device. The two coupling devices can constitute a bayonet mount.

The enclosure preferably comprises a discrete lid for each arm of the transfer means, and each arm is provided with means for releasably holding the respective lid. Such holding means are designed to release the respective lids during transfer of a tool from the corresponding clamping means to the spindle of the support and to accept and retain the respective lids during transfer of a tool from the spindle to the corresponding clamping means.

The depository can comprise a carriage which is reciprocable along a second path extending substantially at right angles to the axis of a tool in the carrier means, and such carriage can have a side facing the arm or arms of the transfer means and the carrier means preferably comprises a plurality (for example a row of two or more) of tool carriers at such side of the carriage. The machine can comprise a substantially horizontal track for the carriage and means for advancing the carriage along the track. Such machine preferably further comprises means for releasably docking the carriage on the advancing means. Furthermore, such machine preferably comprises means for lifting the carriage off the floor during docking at the advancing means. Still further, such machine preferably comprises means for maintaining the carriage in a predetermined position while the carriage is docked at the advancing means.

The carrier means of the depository preferably comprises a plurality of tool carriers, and such machine preferably further comprises sensor means for monitoring the carriers for the presence or absence of tools therein.

The machine preferably further comprises a tool magazine, and the depository is then movable between the magazine and the tool changing station.

In accordance with a further embodiment of the invention, the transfer means can comprise a base, a turret-shaped head mounted on the base and being indexible about a substantially vertical axis as well as tiltable about a substantially horizontal axis. Such head preferably comprises a pair of substantially aligned arms and tool clamping means on each arm. The horizontal axis is preferably disposed at one side of the vertical axis, and the turret-shaped head is tiltable between a first position in which its arms are disposed one above the other and a second position in which the arms are disposed at a predetermined level (for example, at a horizontal level in line with each other).

In accordance with the present invention, the apparatus for transferring rotary tools, particularly grinding tools, between a spindle and a depository comprises a base, a head which is movably mounted on the base, at least one arm which is provided on the head, tool clamping means on the arm, and means (e.g., a stepping motor) for indexing the head between a first position in which the axis of rotation of a tool which is held by the clamping means is substantially horizontal and a second position in which the axis of rotation of such tool is substantially vertical. The apparatus preferably further comprises means for moving a tool which is held by the clamping means with reference to the arm. Such moving means can comprise means for reciprocating the clamping means relative to the arm, for example toward and away from a spindle on the aforementioned support in the first position of the head and toward and away from a carrier of the carrier means in the second position of the head.

The novel features which are considered as characteristic of the invention are set forth in particular in the appended claims. The improved machine and apparatus themselves, however, both as to their construction and their mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
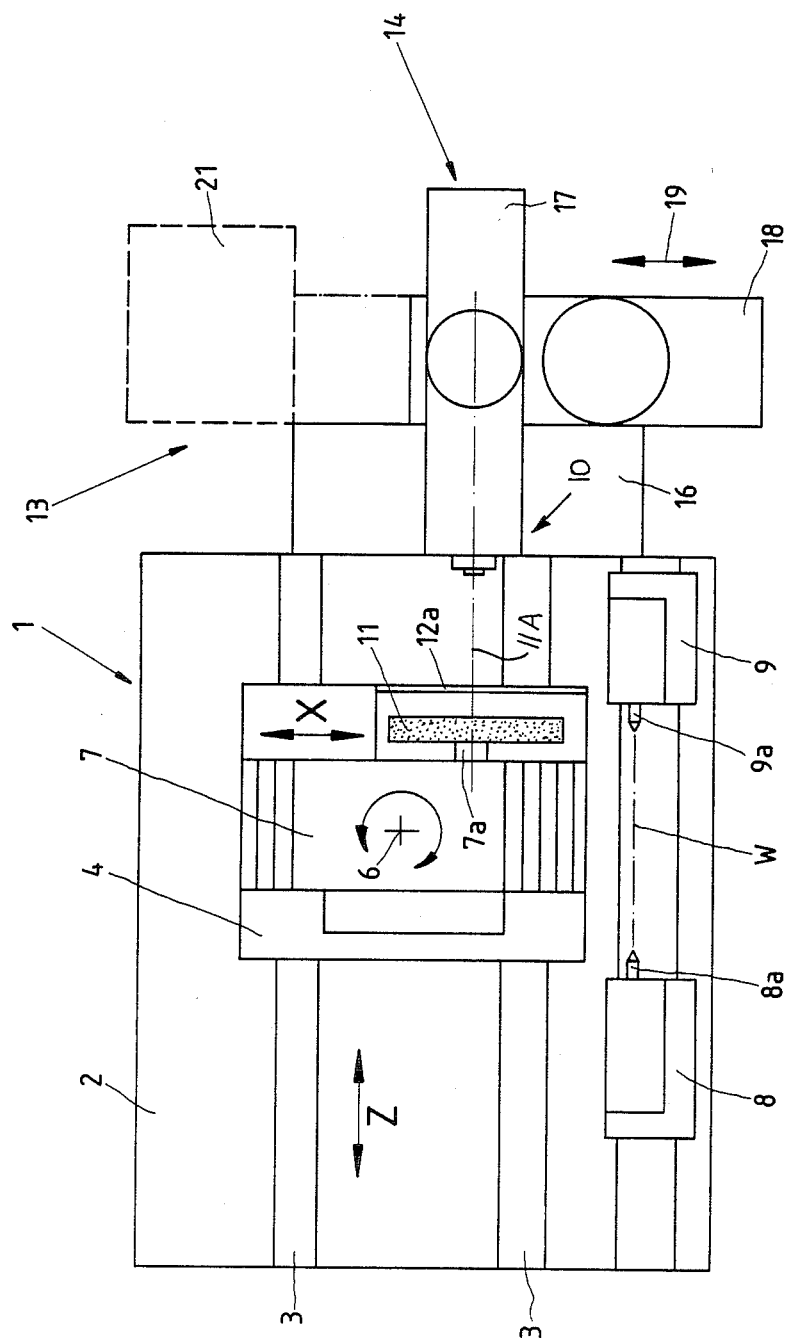
FIG. 1 is a schematic plan view of a circular grinding machine which is provided with a tool changing apparatus embodying one form of the present invention.

FIG. 1 is a plan view of a circular grinding machine 1 which is associated with or embodying a tool changing apparatus which is constructed in accordance with the present invention. The grinding machine 1 comprises a bed 2 having elongated horizontal guide rails 3 extending in the direction of the Z-axis. The rails 3 support a reciprocable slide or carriage 4 which constitutes a means for moving a tool support 7 along an elongated path toward or away from a tool changing station 10. The tool support 7 is reciprocable relative to the slide 4 in directions which are indicated by the double-headed arrow X. Furthermore, the tool support 7 is rotatable about a vertical axis 6. The bed 2 further supports a work holder including a stationary headstock 8, a reciprocable tailstock 9, and means (not shown) for moving the tailstock 9 toward and away from the headstock. A rotary workpiece W (indicated by phantom lines) is held between a torque transmitting element 8a of the headstock 8 and a center 9a of the tailstock 9. As can be seen in FIG. 1, a tool (e.g., a large grinding wheel) 11 is reciprocable toward and away from the workpiece W, is movable in parallelism with the axis of the workpiece which is held between the element 8a and the center 9a, and is rotatable about the axis 6 which is normal to the axis of the rotary workpiece. The support 7 comprises a horizontal spindle 7a which detachably supports the tool 11. Such tool is ready to remove material from the workpiece W while the tool rotates about the axis of the spindle 7a and the workpiece rotates about the common axis of the element 8a and center 9a. The major part of the tool 11 on the spindle 7a is surrounded by a housing 12 of an enclosure which further includes a detachable cover or lid 12a. The housing 12 defines a window or opening 12' which can be closed by the lid 12a.

The grinding machine 1 further comprises a system 13 for temporary storage of several grinding tools, and such system is adjacent to the tool changing station 10. In the embodiment of FIGS. 1 to 8, the system 13 comprises a reciprocatory depository 18 and a stationary magazine 21 for grinding wheels. The motor (not specifically shown) which serves to reciprocate the slide 4 and the tool support 7 along the guide rails 3 advances a tool 11 on the spindle 7a to and away from the tool changing station 10 where such tool can be taken over by a tool transfer unit 14. The unit 14 comprises a stationary base 16 (for example, a column) and a head 17 which is mounted on the column 16 for angular movement about a predetermined axis 27 (see FIG. 2). Such axis is inclined to the vertical, preferably through an angle of substantially 45°. The depository 18 is reciprocable relative to the transfer unit 14 and relative to the bed 2 of the grinding machine 1 in directions which are indicated by a double-headed arrow 19. Such directions extend at right angles to the axes of tools 11 which are temporarily stored in discrete carriers 28 of the depository 18. The magazine 21 constitutes an optional feature of the improved machine. Therefore, such magazine is indicated in FIG. 1 by broken lines. The magazine is necessary or desireable when the number of grinding tools which require temporary storage exceeds the number of carriers 28 in or on the reciprocable depository 18.

Figure 2:
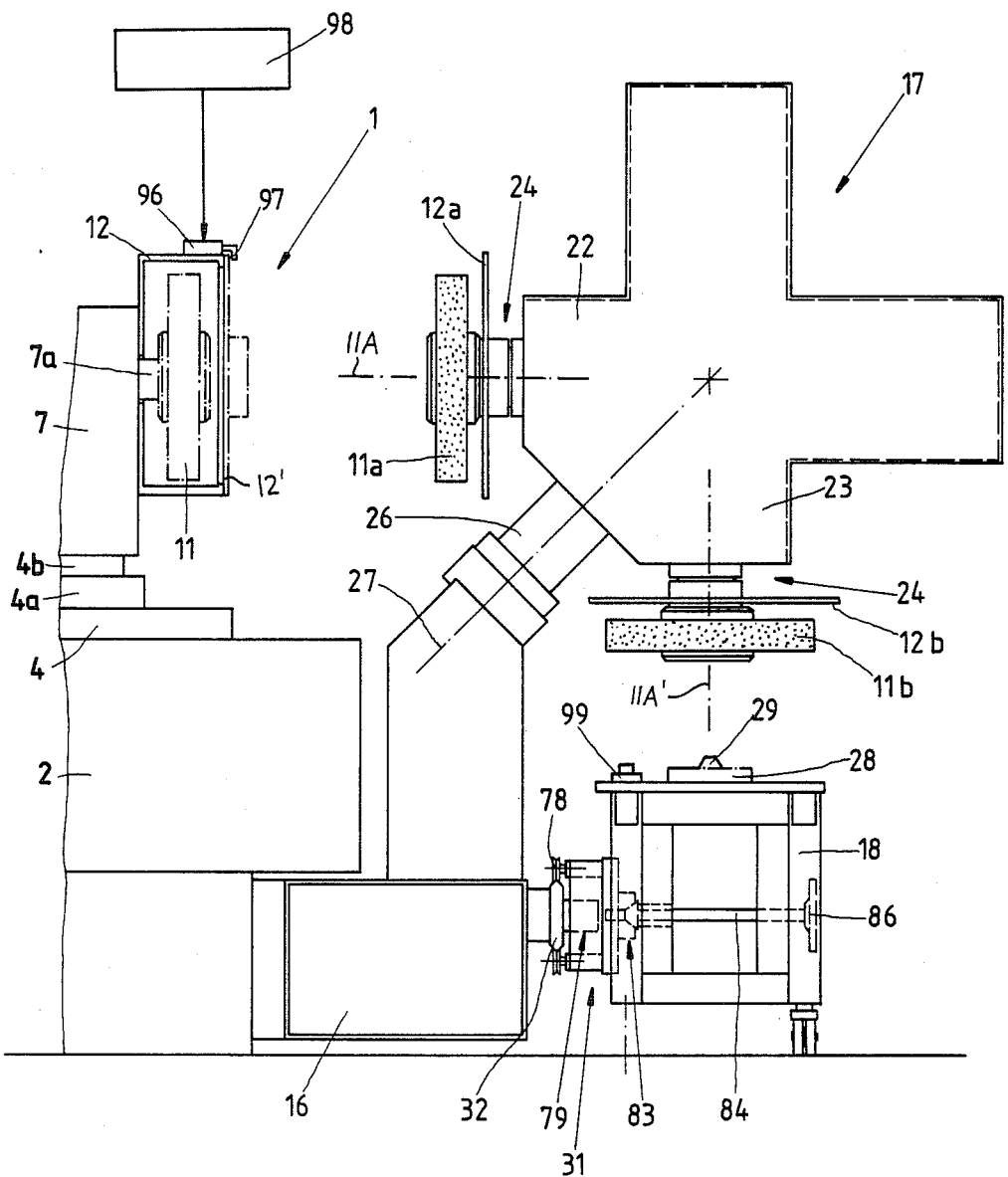
FIG. 2 is an enlarged fragmentary front elevational view of the grinding machine and an enlarged front elevational view of the tool changing apparatus.

As can be seen in FIG. 2, the slide 4 carries a cross slide 4a which is reciprocable in directions indicated by the double-headed arrow X, and the cross slide 4a carries a turntable 4b which is rotatable about the axis 6.

FIG. 2 further shows that the head 17 of the transfer unit 14 comprises two arms 22, 23 which cross each other at right angles and each of which carries a discrete tool clamping mechanism 24. Each clamping mechanism 24 is designed to releasably hold a grinding tool 11 during transfer from a carrier 28 of the depository 18 to the spindle 7a of the support 7 or from the spindle 7a to a selected carrier 28. The details of the arm 22 and of the respective clamping mechanism 24 are shown in detail in FIGS. 3 to 5. The construction of the arm 23 and of the respective clamping mechanism 24 is the same.

The base 16 of the transfer unit 14 is rigidly connected to the bed 2 of the grinding machine 1. This base comprises an inclined shaft 26 which defines the predetermined axis 27. As mentioned above, the axis 27 is preferably inclined to the vertical at an angle of 45°. FIG. 2 further shows that the axis 27 is inclined at an angle of 45° to the axis 11A' which is defined by the clamping mechanism 24 or on the arm 23 as well as to the axis 11A which is defined by the clamping mechanism 24 on the arm 22. The head 17 is indexible with or with reference to the shaft 26 about the axis 27 between two positions in one of which the arm 22 is aligned with the spindle 7a (as actually shown in FIG. 2) and the arm 23 is in line with the adjacent carrier 28 in in the depository 18, and a second position in which the arm 22 is in line with the adjacent carrier 28 while the arm 23 is in line with the spindle 7a of the support 7. The tool which is held by the clamping mechanism 24 on the arm 22 is denoted by the reference character 11a and the tool which is held by the clamping mechanism 24 on the arm 23 of the head 17 is denoted by the character 11b.

The depository 18 is a carriage which is reciprocable along a horizontal path in the directions of the arrow 19. Such path is adjacent to the base 16 of the tool transfer unit 14 and extends between the tool changing station 10 and the magazine 21. FIG. 2 shows the arm 23 in an upright or vertical position in which the respective clamping mechanism 24 is ready to lower the tool 11b onto the carrier 28 therebelow. Such carrier has a centering element 29 which engages the centrally located hub of the tool 11b to ensure that the tool is held in a predetermined position which is best suited for renewed acceptance of the tool by the clamping mechanism 24 on the arm 23 or 22. The carriers 28 are disposed at the upper side of the depository 18, namely at that side which faces the head 17 and its arms 22 and 23. Each of the centering elements 29 can constitute a conical frustum which tapers upwardly toward the adjacent arm 22 or 23. While the depository 18 could be provided with means for positively engaging and holding the deposited tools, such positive holding or engaging action is not absolutely necessary because a relatively large grinding tool 11 is capable of remaining in an optimum position due to its own weight.

Figure 8:
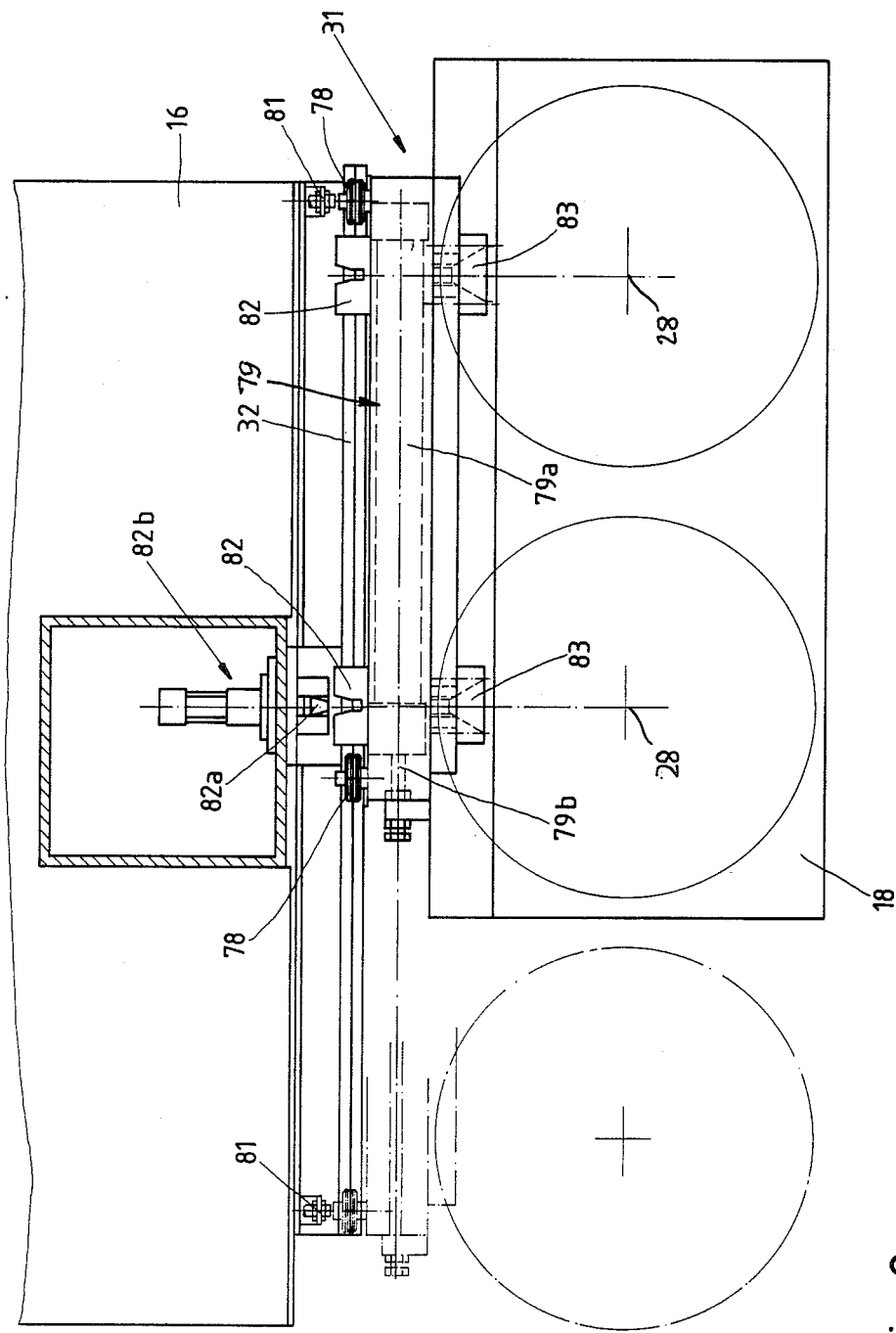
FIG. 8 is an enlarged plan view of the depository for grinding tools and of the means for advancing the depository along the base of the transfer unit.

The means 31 for advancing or moving the depository 18 relative to the base 16 of the transfer unit 14 toward and away from the magazine 21 comprises an elongated horizontal guide rail 32 which is secured to the base 16 and to which the depository 18 can be fixed in a selected position so that the depository 18 is docked relative to the base 16 and head 17 of the transfer unit 14. The details of the advancing means 31 are shown in FIG. 8.

Figure 3:
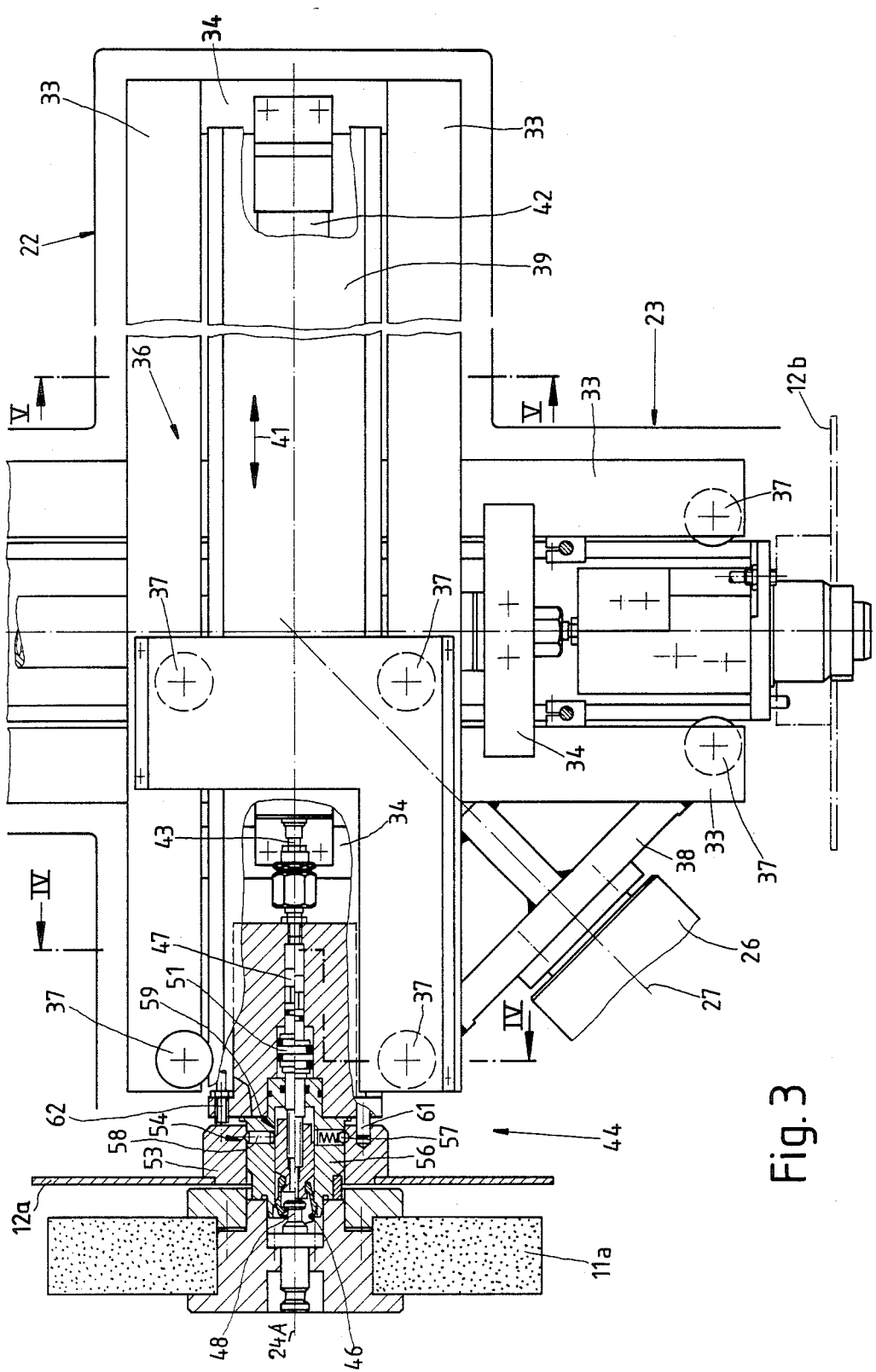
FIG. 3 is an enlarged fragmentary partly front elevational and partly vertical sectional view of the head of the tool changing apparatus, showing in section a grinding wheel which is held by the clamping means of one of the arms.

FIG. 3 shows the details of the arm 22 on the head 17 of the transfer unit 14. This arm comprises two elongated parallel guide members 33 in the form of hollow profiled beams which are rigidly connected to each other by one or more solid or hollow connecting members 34. The guide members 33 of the arm 22 are rigidly connected with the guide members 33 of the arm 23 in the region 36 where the two pairs of guide members intersect each other. This ensures the formation of a rigid cruciform frame which includes the four guide members 33. Such frame is secured to a bearing plate 38 which is indexible relative to the shaft 26 of the base 16 about the predetermined axis 27.

The guide members 33 of the arm 22 carry sets of idler rollers 37 which are engaged by a sliding rail 39 forming part of the respective clamping mechanism 24. The rail 39 is reciprocable in directions which are indicated by a double-headed arrow 41 (see FIG. 3). The rail 39 is parallel to the guide members 33 of the respective arm, and this rail is reciprocable by a motor including a hydraulic cylinder 42 which is secured to one of the transverse connecting members 34 and has a reciprocable piston rod 43 connected to a boss 44 of the rail 39. The piston rod 43 is parallel to the respective guide members 33. The means for securing the boss 44 to the sliding rail 39 comprises a set of bolts 44a (see FIG. 4) or other suitable fastener means.

The boss 44 of each sliding rail 39 comprises means for detachably supporting the lid 12a or 12b of the enclosure for the spindle 7a and the grinding tool 11 on the support 7. Each clamping mechanism 24 further comprises at least two claws 46 which are movable radially by actuating means including a reciprocable push rod 47 so that they can engage with or become disengaged from a collar 48 on the hub of the adjacent grinding tool 11a or 11b. FIG. 3 shows the upper claw 46 in engagement with the collar 48 while the lower claw 46 is shown in disengaged position. The push rod 47 is reciprocable by a piston 51 forming part of a fluid-operated (preferably hydraulic) motor mounted in the respective arm. The piston 51 is rigidly connected with the respective push rod 47. The means for conveying pressurized fluid to and for conveying fluid from the cylinder of the motor including the piston 51 includes conduits 52 which are shown in FIG. 4.

As shown in FIG. 3, the lid 12a of the enclosure for the spindle 7a and tool 11 on such spindle comprises a centrally located hub 53 which is a sleeve having an internal groove 54. The boss 44 of the sliding rail 39 which is shown in FIG. 3 comprises a cylindrical front portion 56 which carries an annulus of detent elements in the form of balls 57 each biased radially outwardly by a coil spring so that it tends to move radially outwardly beyond the cylindrical portion 56 and to penetrate into the internal groove 54 of the boss 53 as soon as the boss 44 assumes a predetermined axial position. When the claws 46 of the clamping mechanism 24 are caused to engage the collar 48 of the grinding tool 11a in response to movement of the push rod 47 in a direction to the right, as seen in FIG. 3, a locating pin 58 of the cylindrical portion 56 is moved radially outwardly by a cam 59 of the push rod 47 so that the radially outermost portion of the pin 58 penetrates into the groove 54 and the lid 12a is retained on the arm 22 in predetermined position which is best suited for attachment to the housing 12 in response to transfer of the grinding tool 11a onto the spindle 7a. An axially parallel locating pin 61 of the boss 44 can penetrate into a recess or bore of the hub 53 on the lid 12a so as to maintain the lid in a predetermined angular position. The locating pin 61 holds the lid 12a against rotation relative to the clamping mechanism 24 while the mechanism 24 holds the grinding tool 11a. A proximity detector 62 is provided to monitor the angular and axial positions of the lid 12a on the clamping mechanism 24 of the arm 22. The detector 62 transmits signals when the lid 12a is not held in proper position so that the transfer of the grinding tool 11a onto the spindle 7a can be interrupted if the position of the lid 12a deviates from the required or optimum position.

Figure 4:
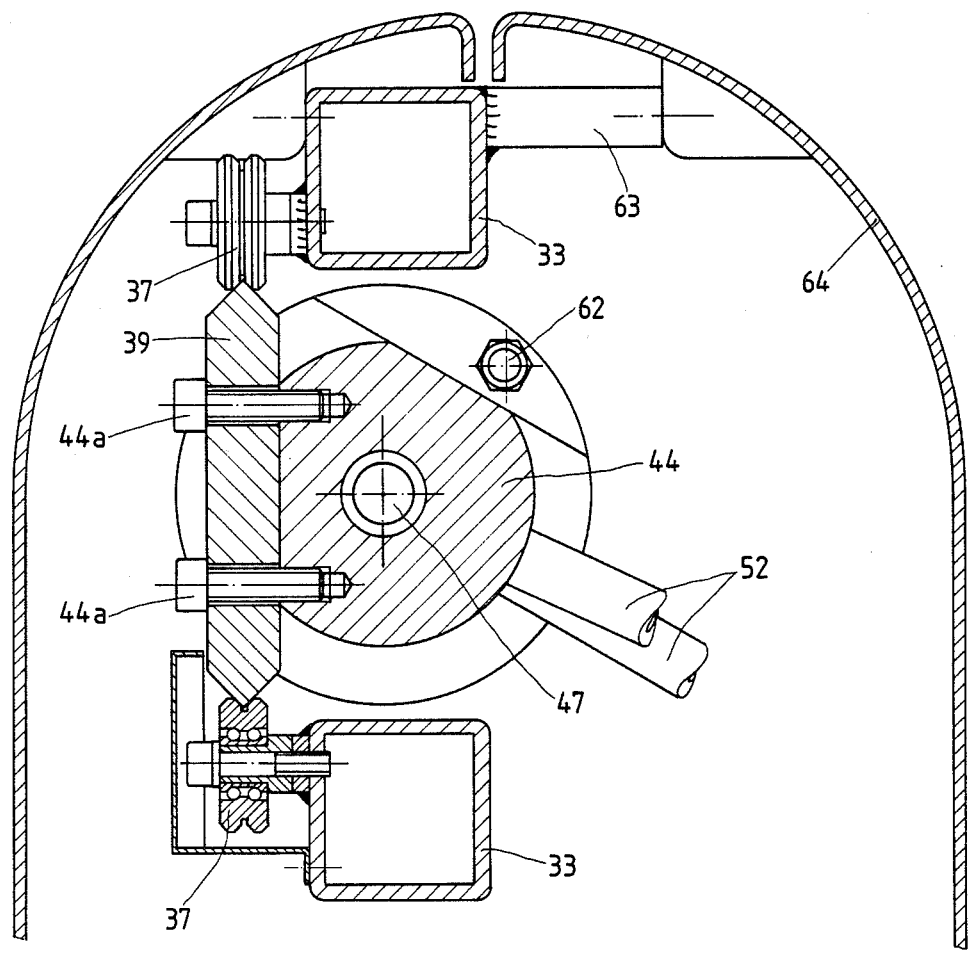
FIG. 4 is an enlarged sectional view as seen in the direction of arrows from the line IV—IV of FIG. 3.
Figure 5:
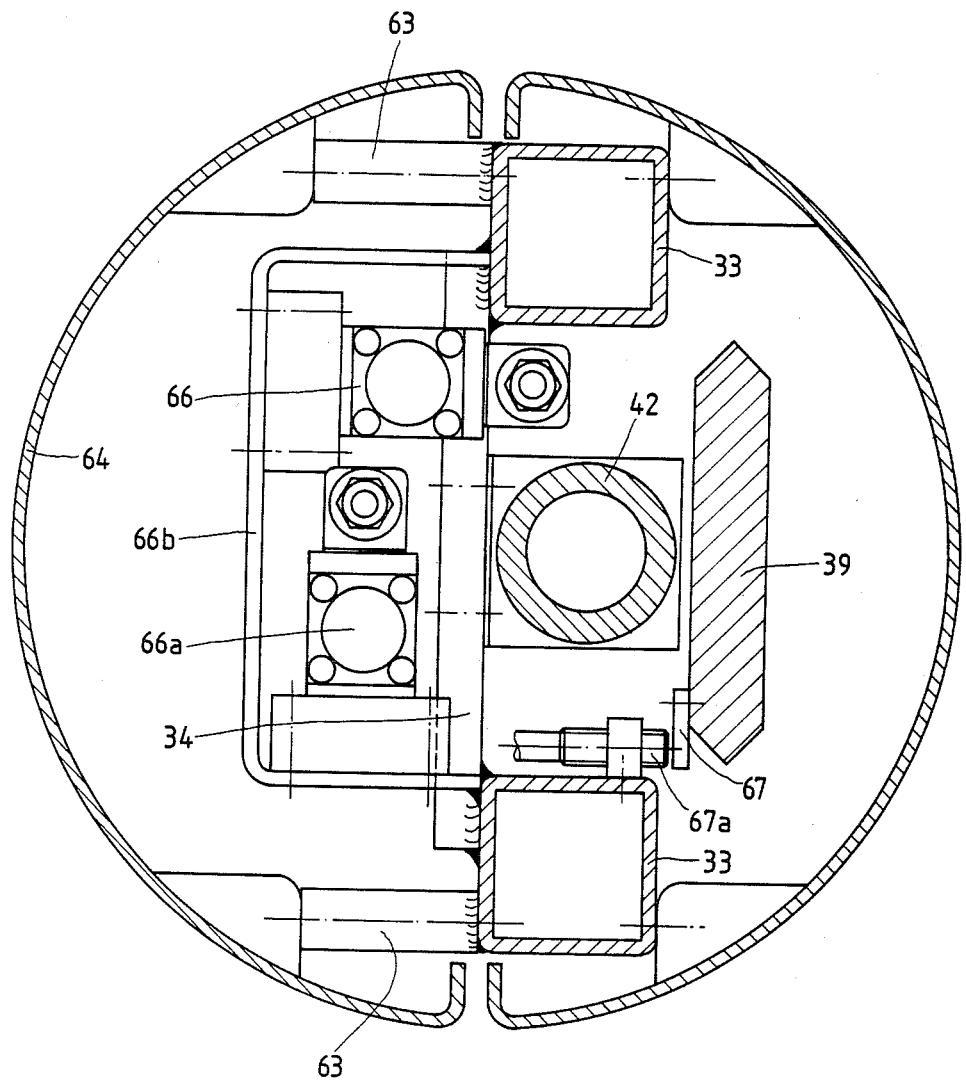
FIG. 5 is an enlarged sectional view as seen in the direction of arrows from the line V—V of FIG. 3.

FIG. 4 shows a shroud 64 which is secured to the upper guide member 33 by one or more studs 63 and serves to partially or completely confine the respective arm 22 or 23. FIG. 5 shows the shroud 64 as well as two electromagnetic valves 66 and 66a which respectively regulate the flow of pressurized hydraulic fluid to the cylinder 42 and to the cylinder for the piston 51. The valves 66 and 66a are mounted on a yoke 66b which is carried by the guide members 33. The sliding rail 39 is provided with actuating lugs 67 cooperating with proximity detectors 67a which monitor the positions of the rail 39 and are mounted on the adjacent guide member 33.

Figure 6:
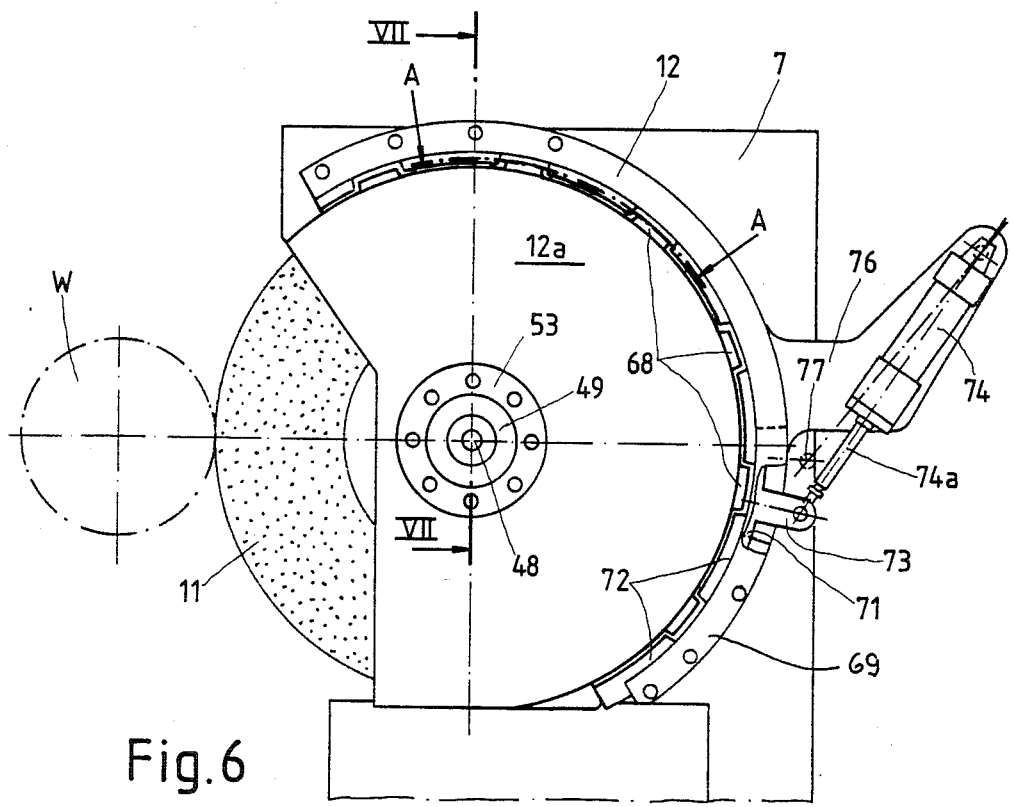
FIG. 6 is a front elevational view of the support for grinding wheels.
Figure 6A:
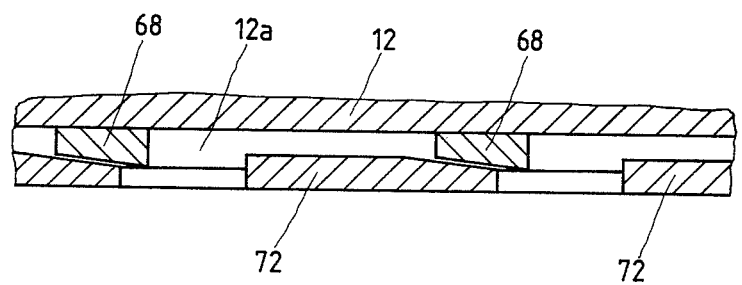
FIG. 6A is an enlarged sectional view as seen in the direction of arrows from the arcuate line A—A of FIG. 6.
Figure 7:
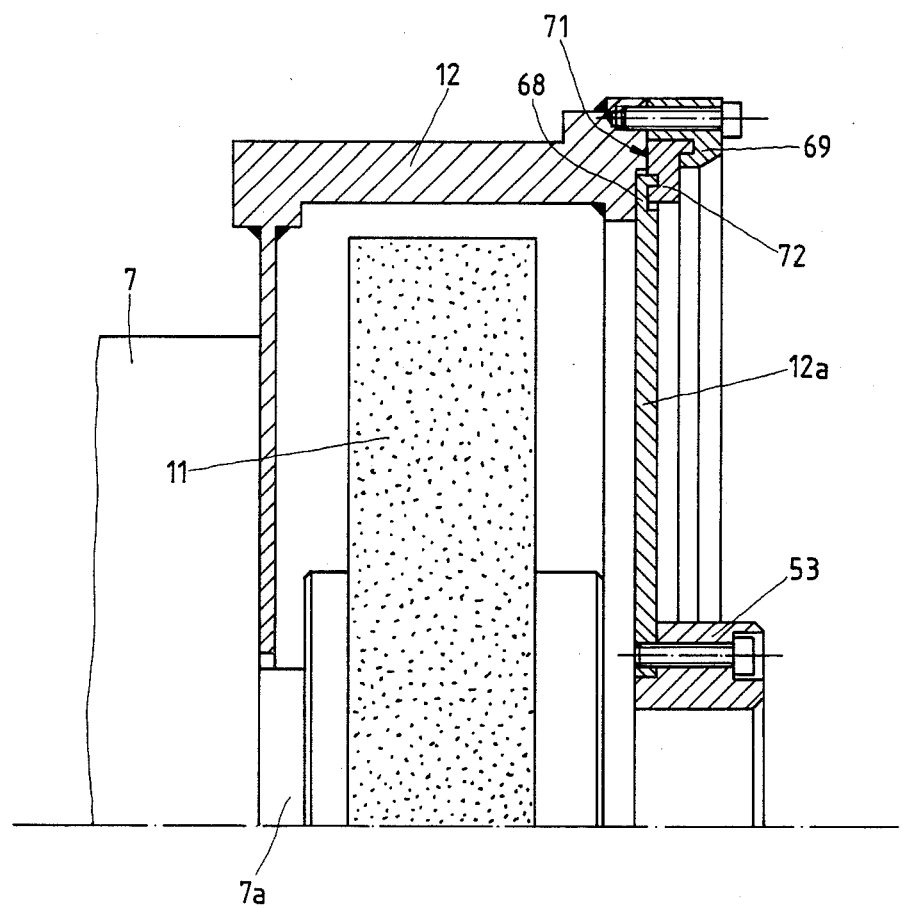
FIG. 7 is an enlarged fragmentary sectional view as seen in the direction of arrows from the line VII—VII of FIG. 6.

FIGS. 6, 6A and 7 illustrate the means for coupling the lid 12a or 12b to the housing 12 of the enclosure for the spindle 7a and the grinding tool 11 on such spindle. The coupling means is designed to ensure rapid attachment of a lid 2 and rapid detachment of such lid from the housing 12. The lid 12a which is shown in FIG. 7 comprises a first coupling device 68 including an annulus of radially outwardly extending teeth 68 each of which has a cuneiform cross-sectional outline. The housing 12 carries a ring-shaped guide 69 for a substantially ring-shaped coupling device 71 rotatable about the axis of the tool 11 which is held by the respective clamping mechanism 24. The internal surface of the coupling device 71 has an annulus of teeth 72 the mutual spacing of which at least slightly exceeds the mutual spacing of teeth forming part of the coupling device 68 on the lid 12a. Mutual spacing of the teeth 68 on the lid 12a slightly exceeds the width of a tooth 72 on the ring-shaped coupling device 71. The device 71 comprises a radially outwardly extending lug 73 which is articulately connected to the piston rod 74a of a cylinder 74 forming part of a motor for moving the coupling device 71 relative to the coupling device 68. The coupling devices 68 on the lid 12a and 71 on the housing 12 can be said to constitute a simple bayonet mount. The motor including the cylinder 74 and the piston rod 74a is preferably a hydraulic motor. The cylinder 74 is pivotally mounted on an arm 76 of the housing 12. Alternatively, the arm 76 can be provided directly on the support 7.

When the transfer of a grinding tool 11 from the clamping mechanism 24 onto the spindle 7a is completed, the respective lid 12a or 12b overlies the window of the housing 12 in a manner as shown in FIG. 6. At such time, the teeth of the coupling device 68 on the lid 12a or 12b alternate with the teeth 73 on the ring-shaped coupling device 71 which is provided on the housing 12. The cylinder 74 is then caused to receive pressurized fluid so that the lug 73 is moved to the phantom-line position 77 of FIG. 6 whereby the teeth 72 engage the adjacent teeth of the coupling device 68 and lock the lid 12a or 12b to the housing 12. The actuation of cylinders 74 results in a counterclockwise angular movement of the coupling device 71, as seen in FIG. 6. FIG. 6A shows the cuneiform shape of the teeth of the coupling device 68 and of the teeth 72; this entails an axial shifting of the lid 12a or 12b relative to the housing 12 so that the lid is pressed against the front end face of the housing and the latter is properly sealed in the region of its window. Furthermore, such axial shifting of the lid 12a or 12b ensures reliable retention of the lid on the housing 12 while the respective tool 11 is in actual use.

FIG. 8 shows the details of the advancing means 31 for moving the depository 18 relative to the tool changing station 10 and the base 16 of the transfer unit 14. The guide rail 32 is rigidly connected to the base 16 (see also FIG. 2) and extends horizontally in a direction toward the magazine 21 and at right angles to the axis of the clamping mechanism 24 which is aligned with one of the carriers 28 on the depository 18. The depository 18 has two rows of roller followers 78 which track the guide rail 32. The means for actually moving the depository 18 along the rail 32 comprises a fluid-operated motor 79 having a cylinder 79a which is mounted on the guide rail 32 and a piston rod 79b which is secured to a laterally extending bracket of the advancing means 31. The two ends of the guide rail 32 carry proximity detectors 81 which generate signals when the depository 18 reaches the respective end positions. The means for accurately locating the depository 18 in each of its two end positions comprises two sockets 82 which are mounted on the advancing means 31 and a reciprocable detent pin 82a which is mounted on the base 16 and is extendable or retractible by a fluid-operated motor 82b. When the pin 82a penetrates into the adjacent socket 82, the depository 18 is held in a predetermined position. The depository 18 has two predetermined positions because it comprises two discrete carriers 28. It is clear that the number of carriers 28 can be increased to three or more without departing from the spirit of the invention.

The means for docking the depository 18 on the advancing means 31 comprises conical receptacles 83 which can receive complementary male conical elements provided on the depository and movable axially by feed screws (not specifically shown). The means for docking the depository 18 comprises a feed screw 84 (FIG. 2) having external threads mating with the internal threads of a nut in the advancing means 31 and being rotatable by means of a hand wheel 86. The docking means further comprises means for slightly lifting the depository 18 above the floor of the plant in which the grinding machine is installed so that the docked position of the depository is not dependent upon and is not influenced by eventual unevennesses of the floor. Such lifting means can include the internal surfaces of the conical receptacles 83 shown in FIG. 8. This ensures a highly reliable and predictable positioning of the depository 18 with reference to the base 16 and a predictable transfer of grinding tools from a carrier 28 onto the arm 22 or 23, or vice versa. The lefthand end position of the depository 18 is indicated in FIG. 8 by phantom lines.

An important advantage of the grinding machine and its tool changing apparatus is that each grinding tool which comes to rest in the depository 18 is held in a substantially horizontal plane (so that its axis) 11A' is vertical. This ensures uniform distribution of coolant in the pores of the deposited grinding tool so that such grinding tool is immediately ready for use, without the need for any balancing, as soon as it is reattached to the spindle 7a of the support 7. Moreover, such storage of grinding tools renders it possible to immediately reuse the tools irrespective of the duration of their storage in the depository 18 or in the magazine 21 wherein the tools are preferably stored in the same orientation as on the carriers 28. Proper distribution of coolant around the axis of a stored tool 11 renders it possible to greatly reduce the down times because each tool can be immediately accelerated to full operating speed as soon as it is reattached to the spindle 7a.

The aforediscussed inclination of the shaft 26 of the base 16 in such a way that the predetermined axis 27 is inclined at an angle of 45° to the vertical renders it possible to construct a highly compact transfer unit 14 which occupies little room between the support 7 and the depository 18. The transfer unit 14 can be installed in immediate proximity of the bed 2 and of the adjacent end portions of guide rails 3 for the slide 4.

The motors including the cylinders 42 in the arms 22 and 23 constitute means for transporting the grinding tools 11a and 11b relative to the respective arms, namely together with the corresponding clamping mechanisms 24, so that the tools can be transferred between the spindle 7a and the arm 22 or 23, or between the arm 22 or 23 and the adjacent carrier 28 of the depository 18.

The provision of means for releasably holding the lids 12a and 12b on the arms 22 and 23 of the transfer unit 14 also contributes to compactness of the improved tool changing apparatus. Thus, it is not necessary to pivot the lid 12a or 12b relative to the housing 12 of the enclosure for the spindle 7a and tool 11 thereon. Instead, it is only necessary to move the lid axially toward or away from the window of the housing 12 simultaneously with axial movement of the corresponding tool 11a or 11b in the axial direction of the spindle 7a. The illustrated arrangement contributes to compactness of the grinding machine much more than an arrangement which would employ pivotable or reciprocable lids. The aforediscussed bayonet mounts including a ring-shaped coupling device 71 on the housing 12 and complementary coupling devices including the teeth 68 on the lids 12a and 12b contribute to the simplicity of means for releasably locking the lid 12a or 12b to the housing 12 in such a way that the thus coupled lid closes the window or opening in the housing. The provision of a discrete lid for each clamping mechanism 24 also contributes to a reduction of down times of the grinding machine. Each lid is attachable to or detachable from the respective clamping mechanism 24 jointly with the corresponding grinding tool 11a or 11b.

As mentioned above, the magazine 21 constitutes an optional feature of the improved grinding machine and the tool changing apparatus. Such magazine will be provided if the grinding machine is to employ a substantial number of tools, namely a number which exceeds the number of carriers 28 at the upper side of the depository 18..

The machine of FIGS. 1 to 8 and its transfer unit are susceptible of many additional modifications. For example, the bayonet mount which is shown in FIGS. 6, 6A and 7 can be replaced with other means for coupling the lid or lids to the housing 12 of the enclosure for the spindle 7a and the grinding tool thereon. As can be seen in FIG. 2, the periphery of the housing 12 of the enclosure for the spindle 7a can carry a set of retaining devices 96 which replace the coupling device 71 and are operable by hydraulic, pneumatic or other motors so as to engage their reciprocable or pivotable jaws 97 with the outer side of a lid 12a or 12b. The motors (e.g., pneumatic motors) which impart motion to the jaws 97 preferably receive signals from the control unit 98 of the grinding machine. The exact construction of such control unit (which transmits signals to all movable parts of the grinding machine and of the transfer unit) forms no part of the present invention.

FIG. 2 shows one of the sensor means 99 which monitor the carriers 28 for the presence of grinding tools and transmit signals to the control unit 98.

Figure 9:
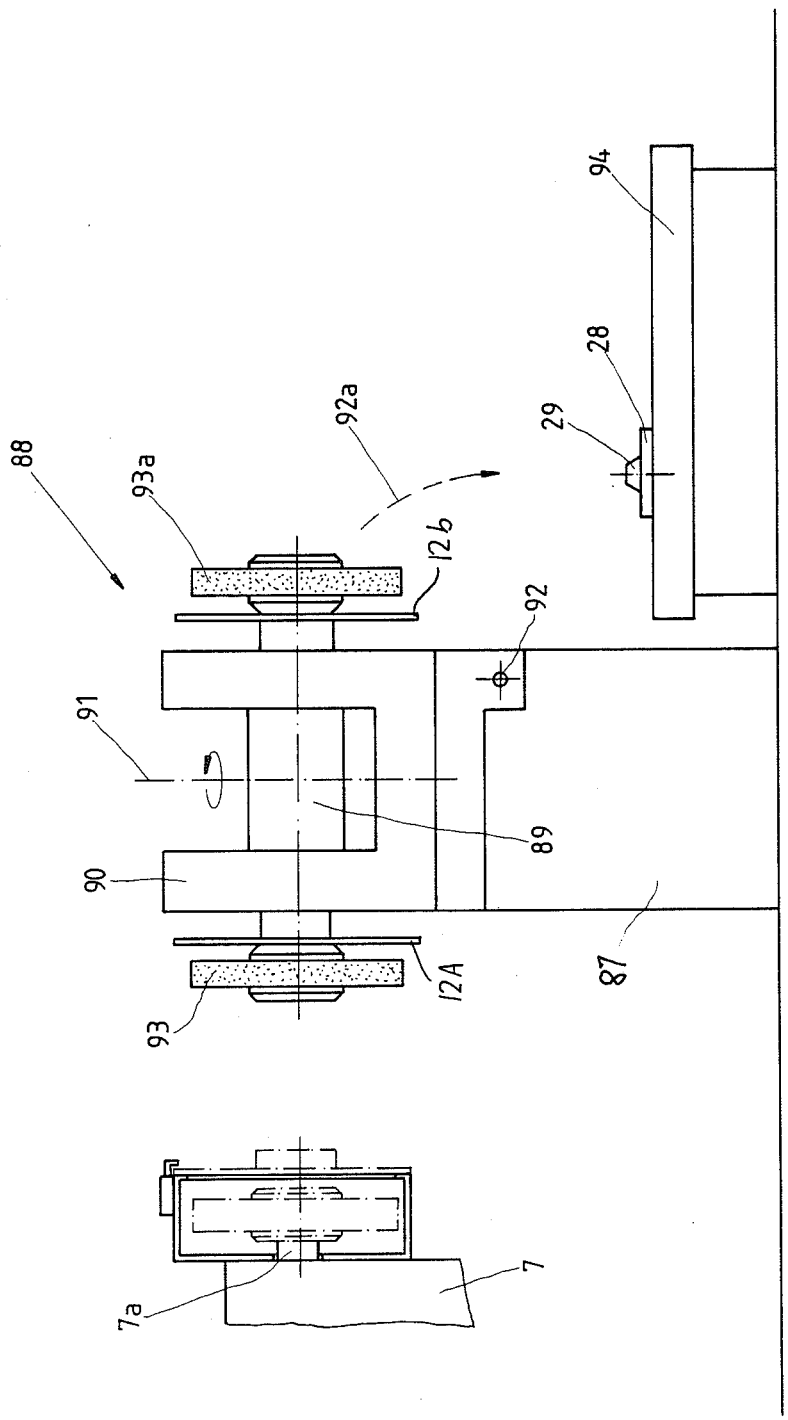
FIG. 9 is a front elevational view of a modified tool changing apparatus with a turret-shaped head which is rotatable about a vertical axis and is also tiltable about a horizontal axis.

FIG. 9 shows a modified transfer unit 88 which can cooperate with a depository 94 and a reciprocable support 7 carrying a rotary spindle 7a for relatively large grinding tools 93, 93a. The transfer unit 88 comprises a stationary base 87 which supports a substantially turret-shaped head 90 for two aligned arms 89 each of which can support a detachable grinding wheel 93, 93a and an adjacent lid 12a, 12b. The head 90 includes an upper portion which is rotatable about a substantially vertical axis 91 and a lower portion which carries the upper portion and is tiltable relative to the base 87 about a substantially horizontal axis 92. The axis 92 is disposed at one side of the vertical axis 91 and enables the upper part as well as the lower part of the head 90 to move between the illustrated position and a second position (note the arrow 92a) in which the right-hand arm 89 is disposed at a level below and is vertically aligned with the left-hand arm 89. The construction of the carriers 28 on the depository 94 is or can be the same as described in connection with FIGS. 1–8. The construction of the arms 89 is or can be the same as that of the arm 22 or 23. When the clamping mechanism of the left-hand arm 89 has been moved in a direction to the left, as seen in FIG. 9, so as to accept the grinding wheel 93 from the spindle 7a, the head 90 is tilted about the horizontal axis 92 so that the right-hand grinding wheel 93a is aligned with and is disposed above the adjacent carrier 28. The clamping mechanism of the right-hand arm 89 is then moved downwardly so that the grinding tool 93a is deposited on and is centered by the conical element 29 of the adjacent carrier 28. The depository 94 can be shifted at right angles to the plane of FIG. 9 so as to move another carrier 28 into register with the right-hand arm 89 whereupon the clamping mechanism of the right-hand arm 89 accepts a fresh grinding tool. In the next step, the upper portion of the head 90 is rotated about the axis 91 (after the head 90 is tilted back to the position of FIG. 9) so that the freshly received grinding tool is moved into register with the spindle 7a. The transfer of a freshly received grinding tool onto the spindle 7a is carried out in the aforedescribed manner. The arrangement is preferably such that the upper portion of the head 90 is rotatable through angles of 180°. The axis 92 allows for tilting of the head 90 through angles of 90°. The depository 94 can constitute a reciprocable carriage or a turntable which carries an annulus of carriers 28 and is indexible about a vertical axis so that it can move a selected carrier to a position in which it can receive a grinding tool (such as 93a) from the adjacent arm 89. The reciprocatory or indexible depository for grinding tools can be replaced by other types of depositories without departing from the spirit of the invention. For example, the depository can comprise a system of pallets each of which can support one or more grinding tools and each of which can be moved into register with an arm of the head of the transfer unit 14 or 88. Analogously, the magazine 21 of the improved grinding machine can be designed in any suitable way so as to support a row of horizontally disposed grinding tools, either next to each other at a single level or one above the other at two or more different levels. All that counts is to provide a space-saving design which allows for storage of a substantial number of grinding tools in a small area and in such a way that the tools can be readily transferred from the magazine onto the depository or vice versa. A presently preferred arrangement employs means for storing several grinding tools at different levels in such a way that the grinding tools are disposed in substantially horizontal planes.

The transfer unit 88 of FIG. 9 is also susceptible of many additional modifications. For example, the head 90 can be indexed about the axis 91 between two, three or more different positions if it carries three or more arms 89. The illustrated arms are aligned with each other so that the grinding tools 93 and 93a are disposed at the opposite sides of the head 90. If the head 90 is a turret with three or more sides, it is indexible through angles of 120°, 90°, 72°, etc. depending upon the number of arms which are mounted thereon. The depository 94 can be disposed at a level above or below the head 90. If the depository 94 is disposed above the head 90, the latter is tiltable about the axis 92 in such a way that it moves a selected grinding tool to a level below the selected carrier 28 which is then provided at the underside of the depository.

An important advantage of the improved machine and of the improved tool changing apparatus is that the duration of down times is reduced to a fraction of down times which are necessary in conventional machines. Furthermore, the machine is more compact than heretofore known grinding machines having tool changing means. The placing of the transfer unit 17 or 88 into immediate or close proximity of the bed of the grinding machine contributes to compactness of the machine and reduces the intervals of time which are required to transfer a grinding tool from a clamping mechanism on the head of the transfer unit to the spindle 7a or vice versa. Furthermore, it is not necessary to provide additional means for moving the support 7 in a direction toward and away from the tool changing station 10. All that is necessary is to employ the slide 4 which is provided anyway and which is reciprocable in the direction of the Z-axis, i.e., in a direction which is normally provided in a grinding machine anyway. Indexing or rotation of the head of the transfer unit from a position in which a tool is aligned with the spindle 7a to a position in which such tool is aligned with a carrier on the depository 18 or 94 also consumes little time.

Another important advantage of the improved machine and of the transfer unit is that the coolant which is confined in the pores of a grinding tool is automatically distributed all around the axis of the tool as soon as the tool is deposited on a carrier 28 or in the magazine 21. This eliminates the need for gradual acceleration of a reused grinding tool after it is reattached to the spindle 7a.

A further important advantage of the improved grinding machine and tool changing apparatus is that the apparatus employs a preferably reciprocable or indexible depository. This contributes to flexibility and versatility of the tool changing apparatus and renders it possible to rapidly deliver grinding tools to or to rapidly remove grinding tools from that arm of the head of the transfer unit which is ready to receive a grinding tool from a carrier or to deliver a grinding tool to the adjacent carrier.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a grinding machine which operates with rotary tools, particularly in a circular grinding machine which operates with large grinding wheels, the combination of a tool support arranged to carry at least one rotary tool so that the axis of rotation of such tool is at least substantially horizontal; means for moving said support along a predetermined path toward and away from a tool changing station; a depository for tools disposed at said station and having a carrier means for carrying tools in such orientation that the axes of the tools are at least substantially vertical, said support being movable relative to and independently of said depository; and transfer means for transferring tools between said support and said carrier means at said station, including means for changing the orientation of the axes of tools from substantially horizontal to substantially vertical during transfer from said support to said carrier means and from substantially vertical to substantially horizontal during transfer from said carrier means to said support, said orientation changing means comprising a head mounted for angular movement about a predetermined axis and said transfer means further comprising two arms which are mounted on said head and are disposed substantially at right angles to each other, and discrete tool clamping means provided on each of said arms, each of said clamping means defining a discrete axis coinciding with the axis of the tool which is held by the respective clamping means, said predetermined axis being disposed at an angle of substantially 45° to the vertical and to each of said discrete axes.

2. The structure of claim 1, further comprising means for moving said carrier means with reference to said station.

3. The structure of claim 1, wherein said transfer means further comprises a base for said head and actuating means for engaging said clamping means with and for disengaging said clamping means from a tool on said support or said carrier means.

4. The structure of claim 3, wherein said transfer means further comprises transporting means for reciprocating said clamping means in the directions of said discrete axes.

5. The structure of claim 1, further comprising means for transporting tools at said station between said transfer means on the one hand and said support or said carrier means on the other hand.

6. The structure of claim 5, wherein each of said arms comprises elongated guide means for the respective clamping means and said transporting means comprises motor means for moving said clamping means along the respective guide means.

7. The structure of claim 6, wherein each of said clamping means comprises a rail and said motor means includes means for moving said rails along the respective guide means.

8. In a grinding machine which operates with rotary tools, particularly in a circular grinding machine which operates with large grinding wheels, the combination of a tool support arranged to carry at least one rotary tool so that the axis of rotation of such tool is at least substantially horizontal, said support comprising a rotary spindle for tools and an enclosure for said spindle and the tool thereon; means for moving said support along a predetermined path toward and away from a tool changing station; a depository for tools disposed at said station and having carrier means for carrying tools in such orientation that the axes of the tools are at least substantially vertical; and transfer means for transferring tools between said support and said carrier means at said station, including means for changing the orientation of the axes of tools from substantially horizontal to substantially vertical during transfer from said support to said carrier means and from substantially vertical to substantially horizontal during transfer from said carrier means to said support, said orientation changing means comprising a head mounted for angular movement about a predetermined axis and said transfer means further comprising two arms which are mounted on said head and are disposed substantially at right angles to each other, and discrete tool clamping means provided on each of said arms, each of said clamping means defining a discrete axis coinciding with the axis of the tool which is held by the respective clamping means, said predetermined axis being disposed at an angle of substantially 45° to the vertical and to each of said discrete axes, said enclosure including a housing provided on said support and having a window for the passage of a tool during transfer of the tool between said spindle and one of said arms, and two separable lids for said window, each of said arms having means for releasably holding one of said lids.

9. The structure of claim 1, wherein said support comprises a rotary spindle for tools and an enclosure for said spindle and the tool thereon, said enclosure including a housing provided on said support and having a window for the passage of a tool during transfer of the tool between said spindle and one of said arms, and two separable lids for said window, each of said arms having means for releasably holding one of said lids.

10. The structure of claim 8, wherein said enclosure further comprises means for releasably coupling one lid at a time to the housing, said holding means including means for locating the one lid in a predetermined position.

11. The structure of claim 10, wherein said coupling means comprises a first coupling device on each lid, a second coupling device on said housing and means for moving said second coupling device into and from engagement with one of said first coupling devices.

12. The structure of claim 11, wherein said second coupling device comprises a ring movable about the axis of the tool which is held by one of said clamping means between a first position of engagement with and a second position of disengagement from a first coupling device.

13. The structure of claim 11, wherein each of said first coupling devices and said second coupling device constitute a bayonet mount.

14. The structure of claim 8, wherein each of said arms, has means for releasably holding the respective lid.

15. The structure of claim 14, wherein said holding means is arranged to release the respective lid during transfer of a tool from the corresponding clamping means to said spindle and to accept and retain the respective lid during transfer of a tool from said spindle to the corresponding clamping means.

16. The structure of claim 1, wherein said depository comprises a carriage which is reciprocable along a second path extending substantially at right angles to the axis of a tool in said carrier means, said carriage having a side facing one said arms and said carrier means comprising a plurality of tool carriers at said side of said carriage.

17. The structure of claim 16, further comprising a substantially horizontal track for said carriage and means for advancing said carriage along said track.

18. The structure of claim 17, further comprising means for releasably docking said carriage on said advancing means.

19. The structure of claim 18, further comprising means for lifting said carriage off the floor during docking on said advancing means.

20. The structure of claim 17, further comprising means for maintaining said carriage in a predetermined position while the carriage is docked on said advancing means.

21. The structure of claim 1, wherein said carrier means comprises a plurality of tool carriers and further comprising sensor means for monitoring said carriers for the presence of tools therein.

22. The structure of claim 1, further comprising a tool magazine, said depository being movable between said magazine and said station.

23. Apparatus for storing, applying and transferring rotary grinding tools, comprising a spindle; a depository; means for moving said spindle relative to and independently of said depository a base; a head movably mounted on said base; a plurality of arms provided on said head; tool clamping means on each of said arms; means for tilting said head between a first position in which the axis of a tool which is held by one of said clamping means is substantially horizontal and a second position in which the axis of rotation of such tool is substantially vertical, and said head including a turret mounted on said base and being selectively indexible about a substantially vertical axis as well as about a substantially horizontal axis.

24. The apparatus of claim 23, further comprising means for moving a tool which is held by one of said clamping means with reference to the respective arm.

25. The apparatus of claim 24, wherein said tool moving means comprises means for reciprocating said clamping means.

26. The apparatus of claim 23, wherein said horizontal axis is disposed at one side of said vertical axis and said turret is tiltable between a first position in which said arms are disposed one above the other and a second position in which said arms are disposed at a predetermined level.

* * * * *